Patented May 29, 1951

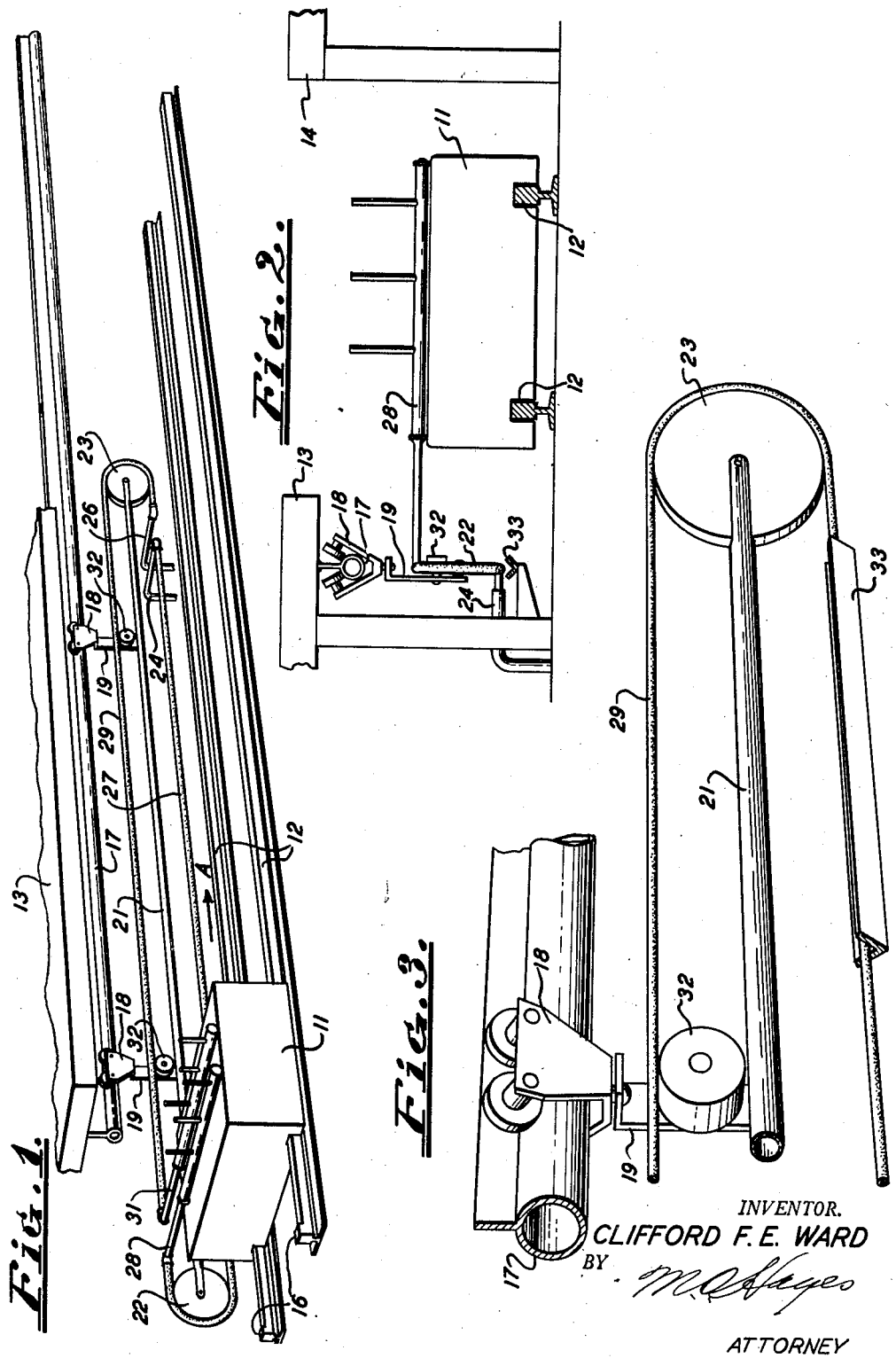

2,554,513

UNITED STATES PATENT OFFICE 2,554,513

FLAME CUTTING APPARATUS

Clifford F. E. Ward, Inglewood, Calif.

Application September 7, 1949, Serial No. 114,448

9 Claims. (Cl. 266—23)

(Granted under the act of March 3, 1883, as amended April 30, 1928; 370 O. G. 757)

This invention relates to carrier apparatus for flexible lines and more particularly to carrier apparatus for flexible conduits to be used in conjunction with flame cutting apparatus.

Heretofore during the operation of power operated traveling flame cutting apparatus, it has been necessary for the operator to lay out flexible gas lines across the floor to the vicinity in which the work was being done. In this there is danger that hot metal or heavy objects may fall upon the conduits thereby damaging or destroying them or possibly starting a fire. Furthermore, production rate of the flame cutting equipment is retarded because the attention of the operator is required to coil and uncoil the conduits as the cutting apparatus traverses its path, and to see that the conduits do not foul up during the operation. Because of loose coils of conduit laying around the apparatus, free trucking of material in the vicinity is hampered.

Attempts have been made to overcome the above disadvantages by suspending the lines from hangers sliding on an overhead monorail. However, this method requires the sharp flexing of the lines at fixed points, resulting in premature breakdown. The sharp bends in the lines also increase flow friction, resulting in pressure drop, at times to the point of inadequacy for the operation of the apparatus.

Another solution to the above disadvantages has resulted in spring operated takeup reels for the gas lines. However, a swivel joint between the supply piping and the flexible line is necessary in this type of equipment; since the gases used in flame cutting are highly flammable, a leak in the swivel joint of the above device would be extremely dangerous.

It is an object of this invention to provide apparatus for overcoming the above disadvantages.

It is another object of this invention to provide apparatus with which a substantially shorter gas line is required to operate flame cutting equipment.

It is a further object of this invention to provide apparatus, the use of which reduces gas flow friction in the conduits.

It is a still further object of this invention to provide covering apparatus which thoroughly protects gas lines and does not in any way distract the operator's attention from the work in progress.

Other objects and many of the attendant advantages of this invention will be readily appreciated as the same becomes better understood by reference to the following description.

The apparatus of the instant invention comprises, generally, conventional flame cutting apparatus which travels back and forth, or reciprocally, along a track. Tables adjacent to and on opposite sides of the path of the flame cutting apparatus, are provided, one for supporting the work, the other for supporting templates or patterns. A monorail guideway parallel to the path of the flame cutting apparatus is mounted to the undersurface of one of these tables. A pair of roller brackets are mounted for free longitudinal reciprocation on the guideway, and support an elongate carrier. A pair of guide members or sheaves are mounted at the respective ends of the carrier.

A pair of gas inlets, one for oxygen, the other for acetylene, or other suitable gas, are fixed adjacent the center of travel of the carrier and the flame cutting apparatus. A line or conduit, connected to one of the fixed inlets, extends around one of the sheaves and is connected at its other end to an outlet on the movable flame cutting apparatus. A second line or conduit, connected to the other fixed inlet, extends around the other of the sheaves on the carrier and is connected to a second outlet on the flame cutting apparatus adjacent the first outlet. Idler rollers are mounted to the brackets, above the carrier. These rollers support those portions of the conduits that are disposed above the carrier during its reciprocation or back and forth movement.

In operation, the flame cutting apparatus reciprocates along the track relative to the pair of fixed inlets. During this movement, the leading conduit is played out while slack in the trailing conduit is simultaneously taken up. The carrier is thereby dragged back and forth on the guideway by the conduits as the cutting apparatus reciprocates, the carrier travelling only one-half the distance traversed by the flame cutting apparatus.

When a type of flame cutting apparatus is in use which prohibits dragging the carrier back and forth, a motor, properly synchronized to the cutting apparatus, can be mounted on the carrier to reciprocate the carrier in synchronism with the flame cutting apparatus. Reversing switches mounted for actuation by the cutting apparatus can be placed to control the movement of the carrier apparatus in the proper direction.

A preferred embodiment of the instant invention has been illustrated in the accompanying drawings, wherein:

Fig. 1 is a perspective view of the basic elements of the flame cutting apparatus showing the carrier apparatus in operating position;

Fig. 2 is an end view of the flame cutting apparatus and the carrier apparatus; and Fig. 3 illustrates a portion of the carrier apparatus showing a bracket and idler roller in detail.

Referring to the drawings, 11 designates conventional flame cutting apparatus which travels reciprocally along the tracks 12. Tables 13 and 14 adjacent to the track 12 and on opposite sides thereof are provided, one 14 for supporting the work, the other 13 for supporting templates or patterns used in conjunction with the apparatus. The tracks 12 are provided with stops 16 at both ends, which limit the travel of the flame cutting apparatus thereon.

A monorail guideway 17, parallel to the tracks 12 is rigidly mounted to the undersurface of one of the tables, preferably table 13. Mounted on the guideway for free reciprocable movement thereon are a pair of roller brackets 18, having pivotably mounted portions 19 thereon which support at the lower extremities thereof an elongate carrier 21. A pair of sheaves 22 and 23 are mounted one at each end of carrier 21.

A pair of gas inlets 24 and 26, one for oxygen and the other for acetylene, are fixed adjacent the center of travel of the carrier 21 and the flame cutting apparatus 11. A conduit 27 is connected to the inlet 24, extends around the sheave 22 and is connected at its other end to an outlet 28 on the movable flame cutting apparatus 11. A second conduit 29 is connected to the inlet 26, extends around the sheave 23 and is connected at its other end to a second outlet 31 adjacent the outlet 28.

Idler rollers 32 are mounted to the pivotable portions 19 of the brackets 18 and above the carrier 21. These rollers 32 support these portions of the conduits 27 and 29 which are suspended above the carrier 21 during its reciprocation.

To prevent undue stress on the conduit couplings at the inlets 24 and 26 and to further protect the conduits, an angle member 33 or trough, is provided, disposed to receive and support the lower portions of the conduits 27 and 29 as they are played out by the movement of the carrier 21.

*Operation*

In operation the flame cutting apparatus 11 normally reciprocates along the tracks 12 relative the fixed inlets 24 and 26. Let us assume that the cutting apparatus 11 is traveling in the direction of the arrow A. As the cutting apparatus 11 begins its movement the end of the conduit 27 which is connected to the outlet 28 moves along with the carrier and exerts force on the sheave 22, over which it rolls, in the direction of the arrow A, thus forcing the carrier to roll along the guideway. Simultaneously the other conduit 29 rolls around the sheave 23 which is being forced against it and which takes up the slack which would normally result from the movement of the flame cutting apparatus 11. Since the length relationship between the carrier apparatus and the conduits 27 and 29 is constant, the conduits serve to drag the carrier back and forth on the guideway, as the flame cutting apparatus 11 reciprocates on the tracks 12. The carrier 21, always moving at half the speed and distance of the cutting apparatus, always maintains the conduits at a predetermined tension.

The location of the conduits and the carrier apparatus on the underside of the table 13 serves to protect the conduits from sparks and/or falling objects which are the principal hazards in this type of apparatus.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. In combination with flame cutting apparatus, carrier apparatus for flexible conduits comprising a guideway, said flame cutting apparatus being mounted for reciprocation parallel to said guideway, a plurality of roller brackets mounted for free longitudinal reciprocation on said guideway, an elongate carrier secured to said brackets, a pair of sheaves mounted at the respective ends of said carrier, a first flexible conduit having one end connected to a first fixed inlet adjacent the center of travel of said carrier, said first conduit extending around one of said sheaves and being connected at its other end to said flame cutting apparatus, a second flexible conduit having one end connected to a second fixed inlet adjacent said first inlet, said second conduit extending around the other of said sheaves and being connected at its other end to said flame cutting apparatus adjacent said first conduit, so that upon reciprocation of said flame cutting apparatus relative to said inlets and parallel to said guideway, one of said conduits is played out while the other is simultaneously taken up, said carrier being thus dragged back and forth by said conduits, and idler rollers mounted to said brackets above said carrier to support the portions of said conduits above said carrier during reciprocation thereof.

2. In combination with flame cutting apparatus, carrier apparatus for flexible conduits comprising a guideway, said flame cutting apparatus being mounted for movement back and forth relative to said guideway, an elongate carrier mounted for back and forth movement on said guideway, a pair of guide members mounted at the respective ends of said carrier, a first flexible conduit having one end connected to a first fixed inlet adjacent the center of travel of said carrier, said first conduit extending around one of said guide members and being connected at its other end to said flame cutting apparatus, a second flexible conduit having one end connected to a second fixed inlet adjacent said first inlet, said second conduit extending around the other of said guide members and being connected at its other end to said flame cutting apparatus adjacent said first conduit, so that upon back and forth movement of said flame cutting apparatus relative to said inlets and parallel to said guideway, one of said conduits is played out while the other is simultaneously taken up, said carrier being thus dragged back and forth by said conduits.

3. Carrier apparatus for flexible conduits comprising a guideway, an elongate carrier mounted for free longitudinal reciprocation on said guideway, a pair of sheaves mounted at the respective ends of said carrier, a first flexible conduit having one end connected to a first fixed inlet adjacent the center of travel of said carrier, said first conduit extending around one of said sheaves and being connected at its other end to a first outlet, a second flexible conduit having one end connected to a second fixed inlet adjacent said first inlet, said second conduit extending around the other of said sheaves and being connected at its other end to a second outlet adjacent said first outlet, said outlets being reciprocable parallel to said reciprocation path, so that upon reciprocation of said outlets relative to said inlets and parallel to said guideway, one of said conduits is played out while the other is simultaneously taken up, said carrier being thus dragged back and forth by said conduits.

4. Carrier apparatus for flexible conduits comprising a guideway, an elongate carrier mounted for free longitudinal reciprocation on said guideway, a pair of guide members mounted at the respective ends of said carrier, a first flexible conduit having one end connected to a first fixed inlet adjacent the center of travel of said carrier, said first conduit extending around one of said guide members and being connected at its other end to a first outlet, a second flexible conduit having one end connected to a second fixed inlet adjacent said first inlet, said second conduit extending around the other of said guide members and being connected at its other end to a second outlet adjacent said first outlet, said outlets being reciprocable parallel to said reciprocation path, so that upon reciprocation of said outlets relative to said inlets and parallel to said guideway, one of said conduits is played out while the other is simultaneously taken up, said carrier being thus dragged back and forth by said conduits.

5. Carrier apparatus for flexible conduits comprising a guideway, a carrier mounted for back and forth movement on said guideway, a pair of guide members mounted at the respective ends of said carrier, a first flexible conduit having one end connected to a first fixed inlet adjacent the path of said carrier, said first conduit extending around one of said guide members and being connected at its other end to a first outlet, a second flexible conduit having one end connected to a second fixed inlet adjacent said first inlet, said second conduit extending around the other of said guide members and being connected at its other end to a second outlet adjacent said first outlet, said outlets being movable back and forth, so that upon back and forth movement of said outlets relative to said inlets, one of said conduits is played out while the other is simultaneously taken up, said carrier being thus dragged back and forth by said conduits.

6. Carrier apparatus for flexible lines comprising a guideway, an elongate carrier mounted for free longitudinal reciprocation on said guideway, a pair of sheaves mounted at the respective ends of said carrier, a first flexible line having one end connected to a first fixed terminal adjacent the center of travel of said carrier, said first line extending around one of said sheaves and being connected at its other end to a first movable terminal, a second flexible line having one end connected to a second fixed terminal adjacent said first fixed terminal, said second line extending around the other of said sheaves and being connected at its other end to a second movable terminal adjacent said first movable terminal, said movable terminals being reciprocable parallel to said reciprocation path, so that upon reciprocation of said movable terminals relative to said fixed terminals and parallel to said guideway, one of said lines is played out while the other is simultaneously taken up, said carrier being thus dragged back and forth by said lines.

7. Carrier apparatus for flexible lines comprising a guideway, an elongate carrier mounted for back and forth movement on said guideway, a pair of sheaves mounted at the respective ends of said carrier, a first flexible line having one end connected to a first fixed terminal adjacent the center of travel of said carrier, said first line extending around one of said sheaves and being connected at its other end to a first movable terminal, a second flexible line having one end connected to a second fixed terminal adjacent said first fixed terminal, said second line extending around the other of said sheaves and being connected at its other end to a second movable terminal adjacent said first movable terminal, said movable terminals being movable back and forth, so that upon back and forth movement of said movable terminals relative to said fixed terminals and parallel to said guideway, one of said lines is played out while the other is simultaneously taken up, said carrier being thus dragged back and forth by said lines.

8. Carrier apparatus for flexible lines comprising a guideway, an elongate carrier mounted for back and forth movement on said guideway, a pair of guide members mounted at the respective ends of said carrier, a first flexible line having one end connected to a first fixed terminal adjacent the path of said carrier, said first line extending around one of said guide members and being connected at its other end to a first movable terminal, a second flexible line having one end connected to a second fixed terminal adjacent said first fixed terminal, said second line extending around the other of said guide members and being connected at its other end to a second movable terminal adjacent said first movable terminal, said movable terminals being movable back and forth, so that upon back and forth movement of said movable terminals relative to said fixed terminals and parallel to said guideway, one of said lines is played out while the other is simultaneously taken up, said carrier being thus dragged back and forth by said lines.

9. Carrier apparatus for flexible lines comprising a guideway, a carrier mounted for back and forth movement on said guideway, a pair of guide members mounted at the respective ends of said carrier, a first flexible line having one end connected to a first fixed terminal adjacent the path of said carrier, said first line extending around one of said guide members and being connected at its other end to a first movable terminal, a second flexible line having one end connected to a second fixed terminal adjacent said first fixed terminal, said second line extending around the other of said guide members and being connected at its other end to a second movable terminal adjacent said first movable terminal, said movable terminals being movable back and forth, so that upon back and forth movement of said movable terminals relative to said fixed terminals, one of said lines is played out while the other is simultaneously taken up, said carrier being thus dragged back and forth by said lines.

CLIFFORD F. E. WARD.

REFERENCES CITED

The following references are of record in the file of this patent:

UNITED STATES PATENTS

| Number | Name | Date |
|---|---|---|
| 1,553,769 | Godfrey | Sept. 15, 1925 |
| 2,000,007 | Anderson | May 7, 1935 |
| 2,264,752 | Groene | Dec. 2, 1941 |
| 2,474,071 | Stetson | June 21, 1949 |
| 2,490,839 | Shaffer et al. | Dec. 13, 1949 |

FOREIGN PATENTS

| Number | Country | Date |
|---|---|---|
| 588,633 | Great Britain | May 29, 1947 |